United States Patent [19]
Bauer, Jr. et al.

[11] Patent Number: 5,097,268
[45] Date of Patent: Mar. 17, 1992

[54] RADAR APPARATUS AND METHOD FOR ENHANCING THE DISPLAY OF MOVING TARGETS

[75] Inventors: Arthur L. Bauer, Jr., Auburn; Peter Redes, Hollis, both of N.H.

[73] Assignee: Raytheon Company, Lexington, Mass.

[21] Appl. No.: 638,860

[22] Filed: Jan. 8, 1991

[51] Int. Cl.⁵ .......................... G01S 7/06; G01S 13/52
[52] U.S. Cl. ................................... 342/160; 342/181; 342/185
[58] Field of Search ............... 392/160, 164, 176, 185, 392/181

[56] References Cited

U.S. PATENT DOCUMENTS

| | | | |
|---|---|---|---|
| 3,325,614 | 6/1967 | Kazan | 342/181 X |
| 3,757,328 | 9/1973 | Goddard | 342/176 X |
| 4,179,681 | 12/1979 | Zehner et al. | 342/181 X |
| 4,443,797 | 4/1984 | Cramp et al. | 342/185 |
| 4,829,308 | 5/1989 | Tol et al. | 342/185 |
| 4,833,475 | 5/1989 | Pease et al. | 342/185 |

FOREIGN PATENT DOCUMENTS 2015847A  3/1978 United Kingdom .

Primary Examiner—Gilberto Barrón, Jr.
Attorney, Agent, or Firm—William R. Clark; Richard M. Sharkansky

[57] ABSTRACT

A radar system that enhances the display of moving targets by using negative scan-to-scan correlation to determine which pixels will be displayed at the brightest level. More specifically, a bit image stores a multi-bit scan-to-scan correlated history for each pixel on a display screen, and when new video data is received on a scan, the bit image memory is modified in accordance therewith. A pixel is enhanced to the brightest level only if a return is received from a spacial location from which returns were not received on previous scans. Thus, a target that moves to a new location is displayed at the brightest level because it doesn't correlate with returns from prior scans.

34 Claims, 5 Drawing Sheets

| $MA_n$ | $MB_n$ | PIXEL INTENSITY |
|---|---|---|
| 0 | 0 | OFF |
| 0 | 1 | DIM |
| 1 | 0 | MEDIUM |
| 1 | 1 | BRIGHT |

*FIG. 4*

| LTI | $MK_{n+1}$ | $MA_n$ | $MB_n$ | $MA_{n+1}$ | $MB_{n+1}$ |
|---|---|---|---|---|---|
| 0 | 0 | 0 | 0 | UNCHANGED | |
| 0 | 0 | 0 | 1 | UNCHANGED | |
| 0 | 0 | 1 | 0 | UNCHANGED | |
| 0 | 0 | 1 | 1 | UNCHANGED | |
| 0 | 1 | 0 | 0 | UNCHANGED | |
| 0 | 1 | 0 | 1 | UNCHANGED | |
| 0 | 1 | 1 | 0 | UNCHANGED | |
| 0 | 1 | 1 | 1 | UNCHANGED | |
| 1 | 0 | 0 | 0 | 0 | 0 |
| 1 | 0 | 0 | 1 | 0 | 0 |
| 1 | 0 | 1 | 0 | 0 | 1 |
| 1 | 0 | 1 | 1 | 1 | 0 |
| 1 | 1 | 0 | 0 | 1 | 1 |
| 1 | 1 | 0 | 1 | 0 | 1 |
| 1 | 1 | 1 | 0 | 0 | 1 |
| 1 | 1 | 1 | 1 | 1 | 0 |

*FIG. 5*

RADAR APPARATUS AND METHOD FOR ENHANCING THE DISPLAY OF MOVING TARGETS

BACKGROUND OF THE INVENTION

The field of the invention generally relates to azimuth scanning radar systems, and more particularly relates to radar apparatus and method for enhancing the display of moving targets using scan-to-scan correlation.

As is well known, airport ground controllers need to keep track of aircraft and ground vehicles in and around an airport. For example, in order to insure that runways and taxiways are clear for traffic, controllers need to know the location of aircraft, and also whether they are taking off, landing, taxiing, or parking. During clear weather, ground controllers in the tower can rely heavily on visual observation of the aircraft and ground vehicles. However, during fog or other weather conditions of adverse visibility, parts or all of the airfield may not be clearly visible from the tower. Accordingly, during conditions of limited or adverse visibility, the ground controllers must rely heavily on the airport ground surveillance radar. Further, these are critical times because the visibility of pilots may often be obscured so there is a greater probability of a pilot moving his aircraft to an unintended or unauthorized location.

It is also well known that a pulse radar for such an airport installation typically has an antenna that scans in azimuth while transmitting pulses. When a transmitted pulse strikes an object, an echo or return is received back at the antenna and the time of receipt is a function of the range to the object from which it was reflected. Thus, the input to the radar receiver for one transmitted pulse can be categorized as a train of echoes or pulses from objects at different distances. Unfortunately, transmitted pulses reflect back from objects that are not of interest to the radar operator. For example, at an airport installation, echoes or returns are typically received from terminal buildings, runway lights, and ground clutter which may, for example, be returns from grassy areas surrounding the runways and taxiways. In fact, at a typical installation, the returns from objects that are not of interest vastly out number the returns from targets of interest. In other words, the display of the targets of interest may often be masked or cluttered by the display of returns from objects that are not of interest. This situation may make the radar display confusing to the operator thereby impeding the efficient performance of his job. The operator's task is further complicated by the fact that he should be primarily interested in targets that are actually moving (e.g. aircraft taxiing, landing, and taking off, as well as ground vehicles driving on the taxiways and apron areas) because these represent the greatest potential for collision.

U.S. Pat. No. 4,833,475 describes a pulse radar system that is particularly adapted for on-board operation in a marine environment. The system performs signal processing on echo return signals and, in response thereto, provides a raster scan display that is refreshed from an x,y bit image memory that has two bits corresponding to each picture element or pixel of the radar image so that each pixel can be displayed at different levels of brightness. The two bits for each pixel in the bit image memory are a function of the history of echo returns from the spacial location with which the pixel corresponds. More specifically, following some analog processing to reduce the effects of clutter returns, the echo signals are digitized into a plurality of successive single bit range cells or bins for each transmitted pulse. Then, a scan converter is used to provide a corresponding x,y address for each range cell so that the digitized data or video can be mapped to the respective x,y coordinates of the bit image memory. In particular, as the data for each range cell is read out of a range cell memory, the contents (digital level 00-11) of the corresponding bit image memory location is read and then modified in accordance with the new range cell video data. Next, the modified data is written back into the bit image memory. If the new video data indicates that an echo was detected, the level in the corresponding location of the bit image memory is incremented to a brighter level up to binary 11, and if no return was detected, the level is decremented. In such manner, scan-to-scan correlation is used to provide spacial discrimination of clutter. That is, due to the dynamic nature of clutter, and in particular sea clutter, there is only a small probability of receiving a return from the same spacial location on successive scans. Thus, because clutter does not tend to correlate positively from scan-to-scan, the clutter generally does not display at a bright, or enhanced level. However, targets that do have positive correlation from scan-to-scan are able to build up the stored level within the bit image memory, and thus their display is enhanced. This described technique, however, does not provide advantageous operation in the earlier described airport environment because moving targets which are of the most interest would not have positive scan-to-scan correlation. Thus, such moving targets would be displayed at reduced brightness.

SUMMARY OF THE INVENTION

It is an object of the present invention to provide a radar system that enhances the display of moving objects or targets.

It is a further object to provide a relatively inexpensive radar system that enhances the display of moving targets while indicating the presence of stationary objects or targets by displaying them at a reduced brightness level.

It is a further object to provide a radar system that gives the operator an instantaneous indication of the speed and direction of moving targets.

These and other objects and advantages are provided by a method of processing radar returns received on a plurality of scans of a region, comprising the steps of providing a scan-to-scan correlated image of radar returns from a region and displaying said image as a plurality of pixels wherein the display of pixels corresponding to new radar returns without positive correlation on at least the immediately prior scan of the region is enhanced. For example, the enhancement may be provided by displaying pixels at a brighter level than other pixels or displaying at a different color than other pixels. If a new radar return has been detected from a spacial location from which radar returns were not detected on immediately previous scans (i.e. no positive correlation with prior scans), that is indicative that a target or object may have just moved to that spacial location. Accordingly, because moving targets may be of the most interest to the operator of a ground surveillance radar, those target corresponding pixels are displayed at the brightest level thereby indicating motion. If the radar returns persist from that location indicating that the object may have stopped moving, the corresponding pixels are still displayed on subsequent scans but at a reduced brightness level. The method may also preferably include the step of digitizing the radar returns before providing the scan-to-scan correlation. Also, it may be preferable to include the step of storing the scan-to-scan correlated radar returns in a bit image memory having a plurality of bits corresponding to each pixel.

The invention can also be practiced by a radar apparatus for azimuth scanning a region on a plurality of successive scans, the apparatus comprising a raster scan visual display, bit image memory means for providing digital data to raster scan the visual display wherein the memory means has a multi-bit storage location for each pixel on at least a portion of the raster scan display such that each of the pixels can be displayed at one of a plurality of different brightness levels, and means responsive to echo returns from objects in the region on a plurality of successive scans for developing a scan-to-scan correlated radar image of the region in the bit image memory, the developing means comprising means for providing digitized data to the memory means to provide a bright level display of each pixel that corresponds to an echo return from a respective spacial location from which an echo return was not received on a predetermined number of prior scans. Such radar enhances the display of moving targets in the region because they have moved to new locations since the last scan; thus, their returns from such locations will not correlate with returns from the same spacial locations on immediately prior scans. In other words, it may be indicative that an object is located at that spacial location for the first time during the present scan (i.e. it has just moved to that location). It is preferable that the developing means comprises means for providing a dimmer level display for each pixel that corresponds to an echo return from a respective spacial location from which an echo return was received on the last scan. It is also preferable that the developing means comprises means for displaying one of the bright level pixels at a dimmer level after at least one scan in which no corresponding echo return is received. Further, it is preferable that the developing means comprises means for limiting the digitized data update for each pixel to once per scan.

With such arrangement, if an object such as an aircraft is moving, returns from it are received from new location from which there are no correlating returns on previous scans. Thus, such aircraft is displayed at an enhanced or brightest possible level for that scan. Then, whether or not the returns persist from that location, the corresponding pixel is decayed in brightness through medium to dim. If the aircraft stays at that location thereby indicating it is parked, the display remains at the dim level for so long as the returns persist. If the aircraft has moved to a new location, the image will disappear, but the gradually decaying brightness levels provide a trail effect giving an instantaneous visual indication of the speed and direction of movement.

BRIEF DESCRIPTION OF THE DRAWINGS

The foregoing objects and advantages will be more fully understood by reading the description of the preferred embodiments with reference to the drawings wherein:

FIG. 4 is a table showing the correspondence between the contents of the video memory and the displayed pixel intensity;

FIG. 5 depicts the operation of the programmable array logic used to modify the video memory in accordance with the invention;

DESCRIPTION OF THE PREFERRED EMBODIMENTS

U.S. Pat. No. 4,833,475 describes an azimuth scanning pulse radar system that is particularly adapted to operate advantageously on board a ship in a marine environment. In addition to sophisticated signal processing to reduce the effects of clutter, and in particular sea clutter, programmable array logic PAL is used to provide scan-to-scan correlation. More specifically, a bit image memory stores a multi-bit history for each picture element or pixel on the screen, and when new data is received, the PAL modifies the bit image memory in accordance therewith. The PAL operates according to positive correlation. That is, the display of a pixel is only enhanced if there are multiple detected returns from the same spacial location. Due to the dynamic nature of sea clutter, it has relative low probability of positive correlation. Thus, the radar system discriminates against enhancing the display of sea clutter.

Figure 2:
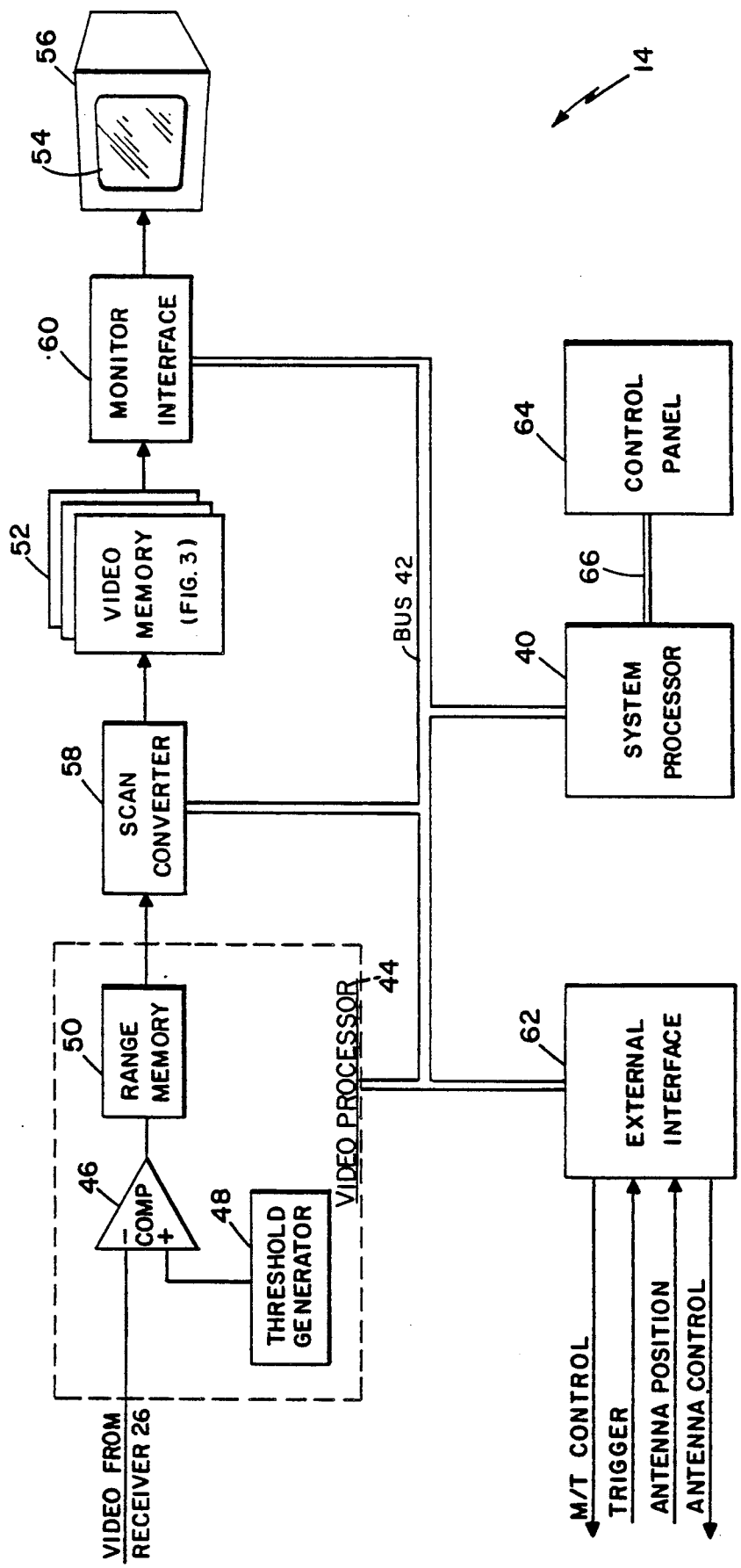
FIG. 2 is a block diagram of the display of FIG. 1.
Figure 3:
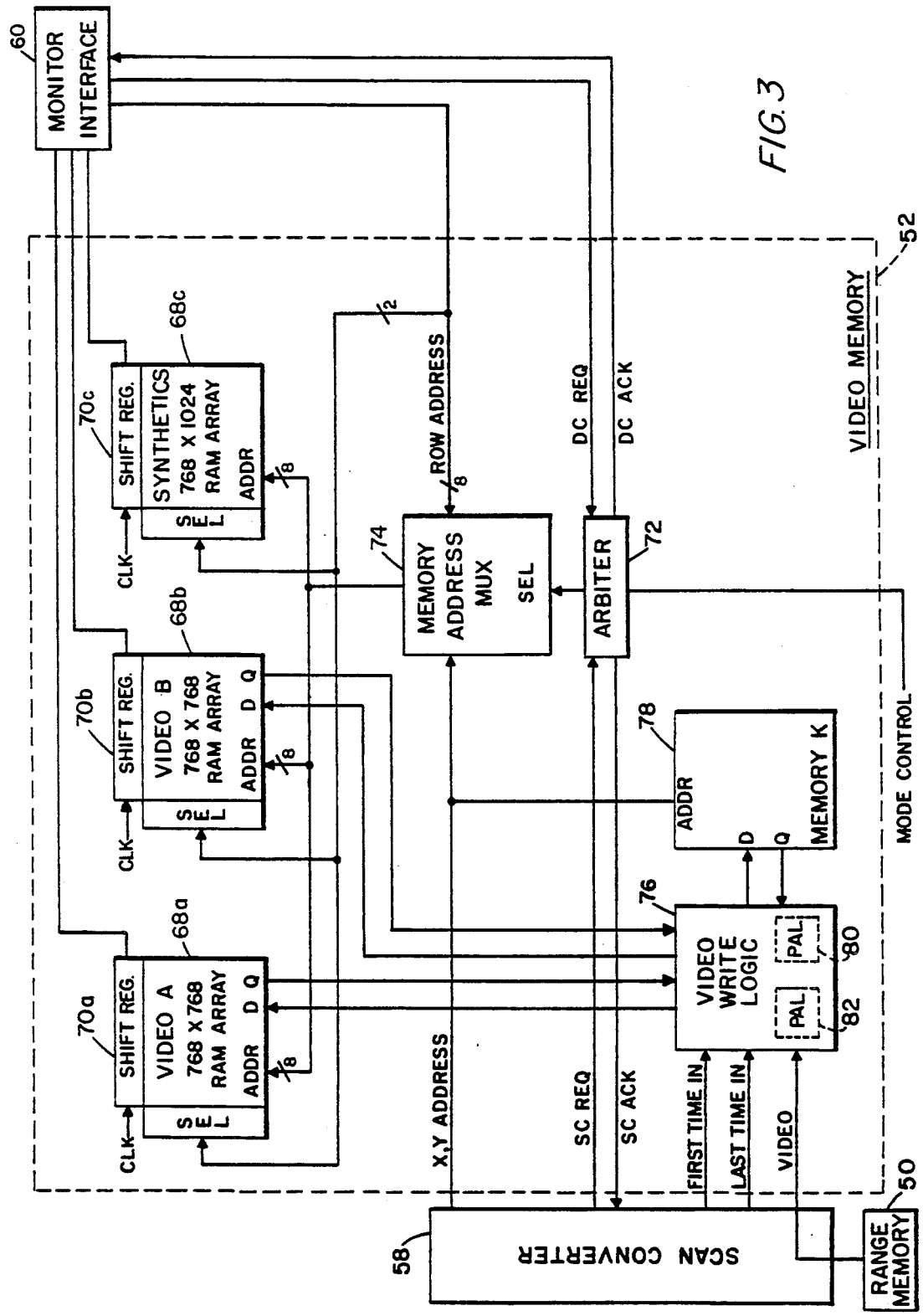
FIG. 3 is the video memory shown in FIG. 2.

In accordance with the present invention, the above described radar system was modified by substituting PAL 82 as shown in FIG. 3 and defined by FIG. 5. Thus, a new and different set of rules is provided for updating or modifying the video image developed or built up in video memory 52 (FIG. 2). More specifically, rather than enhancing the display of detected echo returns with positive correlation, PAL 82 enhances the display of detected echo returns that do not have positive correlation (i.e. they have negative correlation). Thus, using spacial discrimination rather than such technique as doppler frequency shift, the display of moving targets is enhanced because their returns are reflected from new locations (i.e. locations without positive correlation to other returns). U.S. Pat. No. 4,833,475, which is assigned to the same assignee as herein, is hereby incorporated by reference, and it provides a more detailed description of some of the components to be described hereinafter.

Figure 1:
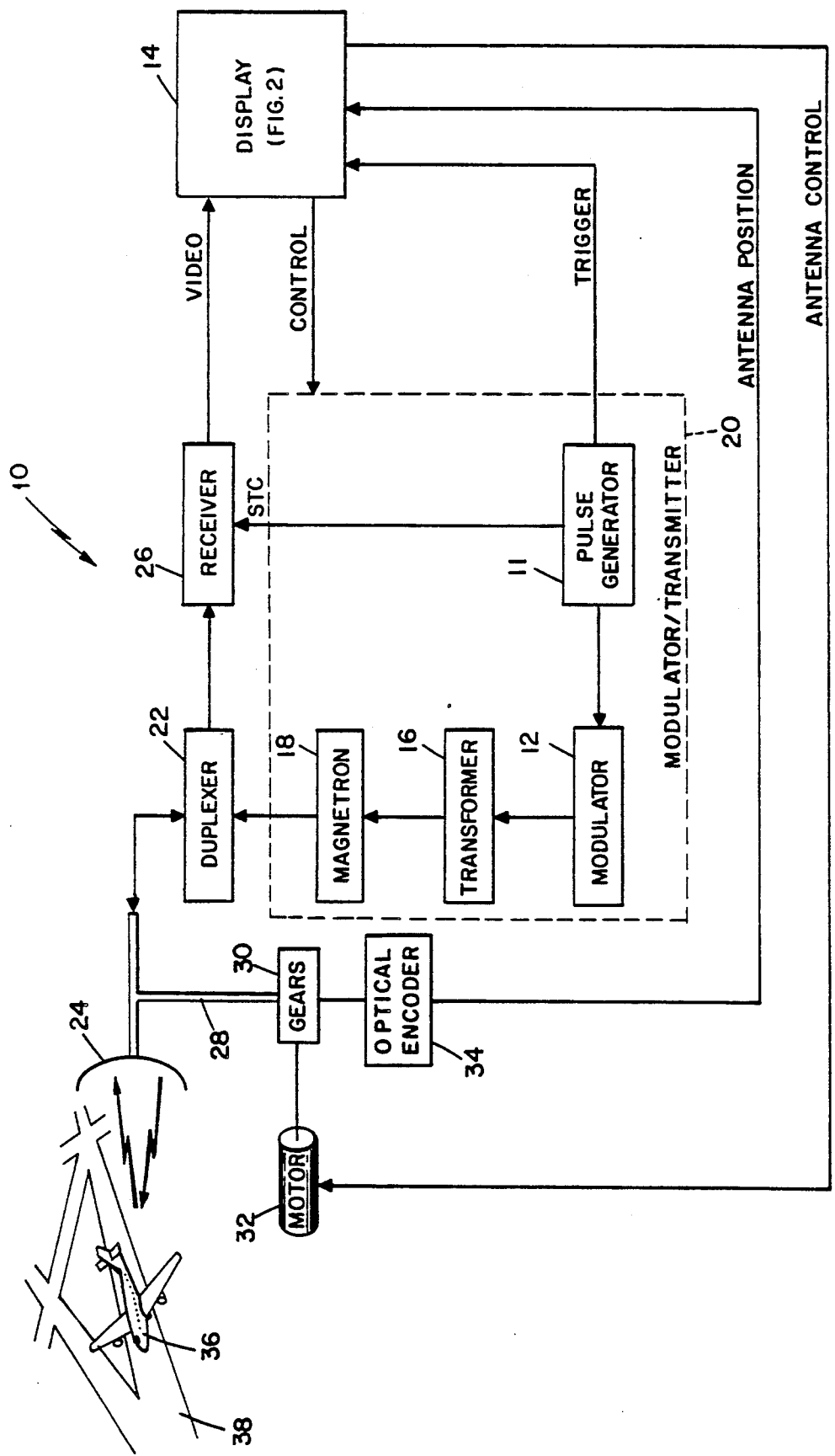
FIG. 1 is a block diagram of a radar system used to advantage in detecting moving targets such as aircraft in an airport ground surveillance environment.

Now, referring to the drawings wherein like numbers refer to like parts throughout the several views, FIG. 1 shows a basic block diagram of a radar system 10 which, as will be described, is adapted to be used advantageously at a fixed service radar installation such as for an airport ground surveillance radar. The transmission of a radar pulse is initiated by pulse generator 11 which simultaneously couples the radar trigger pulse to modulator 12 and display 14. The modulator 12 generates the waveform to be transmitted and couples it through transformer 16 to magnetron 18 where it is converted to pulsed microwave power. The pulse generator 11, modulator 12, transformer 16 and magnetron 18 form the modulator/transmitter 20. Duplexer 22 operates by coupling the microwave power from the modulator/transmitter 20 to antenna 24 during one portion of the radar pulse, and then coupling the radar return echoes from the antenna 24 to the receiver 26 during the remainder of the radar pulse. The combination of the modulator/transmitter 20 and receiver 26 is referred to as MTR which stands for modulator/transmitter/receiver. The MTR may be mounted on the antenna pedestal or separately; in either case, the radar operational parameters of the MTR are determined by CONTROL signal from display 14.

Typically, in an airport ground surveillance installation, the antenna 24 is mounted at a fixed location such that the radar pulses are radiated to the various surveillance parts of the airfield clear of any close by obstructions. The shaft 28 of the antenna 24 is connected to gears 30 which are driven by motor 32 to rotate the azimuth of the antenna 24. An ANTENNA CONTROL signal which causes the antenna to rotate for azimuth scanning is provided either directly or indirectly to motor 32 from display 14. An optical encoder 34 is coupled to gears 30 and provides display 14 with an ANTENNA POSITION signal.

When a transmitted pulse strikes an object such as, for example, an aircraft 36 taxiing on a taxiway 38, an echo or return is reflected back to the antenna 24 where it is coupled through duplexer 22 to receiver 26. The elapsed time from transmission to reception is proportional to the distance traveled. Accordingly, as is well known, the input to receiver 26 for one transmitted pulse can be characterized as a train of echoes or pulses from objects at different distances. Generally, the echoes or returns can be characterized into signals which are of interest (some, such as moving targets, having more interest than others) and clutter which is not of interest. For example, ground clutter is a result of reflections from the ground and rain clutter results from reflections from moisture in the air and, among other things, is dependent on the intensity of the rain. In response to STC trigger from pulse generator 11, the sensitivity of receiver 26 is time controlled to prevent clutter from saturating the receiver front end under the worst conditions. After amplifying the return pulses, receiver 26 converts them to an IF; the IF amplifier is logarithmic from noise level up to a level in excess of the highest clutter returns to be encountered. Next, receiver 26 demodulates the IF to convert to a VIDEO signal which is coupled to display 14.

Referring to FIG. 2, display 14 is under the control of system processor 40 which communicates with the other modules using system bus 42. The radar VIDEO signal from receiver 26 is first received by video processor 44. More specifically, the VIDEO signal is coupled to the negative input of comparator 46 while the positive input is fed from threshold generator 48. Preferably, threshold generator 48 provides a range varying threshold voltage that is derived from a mathematical model executed by system processor 40 for a plurality of range increments. In such manner, the threshold or reference voltage can be set to a level above weak clutter echoes or returns, but below returns from targets of interest such as aircraft and ground vehicles. Comparator 46 has a positive output only if the VIDEO signal is above the threshold voltage. Such positive outputs are generally referred to as detected returns. The output of comparator 46 is clocked into range memory 50 in synchronism with the range cells or bins. Thus, the VIDEO signal is digitized into range cells within range memory 50 in accordance with whether the VIDEO signal is above or below the range dependent voltage threshold for each range cell. A comprehensive discussion of a technique for generation of a suitable threshold voltage along with other signal processing techniques such as, for example, pulse processing and beam processing is provided in U.S. Pat. No. 4,833,475.

Still referring to FIG. 2, video memory 52 is organized into two planes of dynamic memory each having one bit per image pixel for radar video data and one plane of dynamic memory having one bit per image pixel for synthetic data. Here, each radar video plane is 768×768 cells for display on the left-hand portion of CRT screen 54 of monitor 56. The synthetic plane is 768×1024 cells for use over the entire CRT screen 54 and has a 1:1 correspondence with the picture elements or pixels of screen 54. The right-hand portion of screen 54 may preferably be used for data readouts. As will be described in detail later herein, the data is read out of bit image video memory 52 and used to raster scan monitor 56 such that there is a radar image raster of 768×768 pixels, each corresponding to a spacial location within the scanned region of antenna 24.

The digitized video data stored in range memory 50 is in range/azimuth format, and therefore must be converted to x,y format so that x,y video memory 52 can be updated or modified in accordance therewith. This scan conversion process is provided by a suitable scan converter 58. Upon receiving a conversion command from system processor 40, scan converter 58 provides range addresses to sequentially read single-bit digitized video data from the range bins of range memory 50. For each digitized data bit read from range memory 50, scan converter 58 provides a corresponding x,y address to video memory 52. Each such x,y address maps the digitized range/azimuth video into the x,y format of video memory 52.

Still referring to FIG. 2, monitor interface 60 sequentially removes lines of data from video memory 52 and, after combining the data from the memory planes into a composite video stream, clocks the data to monitor 56 for raster scan display of screen 54. Monitor interface 60 also generates the memory refresh commands for the dynamic memory of video memory 52. Monitor 56 is a conventional raster scan CRT display monitor and has capability for either displaying data at different brightnesses or at different colors.

External interface 62 provides system processor 40 with an interface for status and control of the antenna 24 and MTR. System processor 40 communicates with the control panel 64 using peripheral bus 66 which is dedicated to the interfacing function between them. Control panel 64 may include, for example, such conventional devices as a track ball, analog controls, and switch panels which are used to provide operator inputs. These controls (not shown) are polled by the system processor 40, and the status is sent to the system processor 40 upon command. System processor 40 can also enable indicators on control panel 64 to indicate the status of various functions. Further, system processor 40 may preferably have the capability of sounding an audible indicator (not shown) on control panel 64 upon detection of a potentially hazardous condition.

Referring to FIG. 3, there is shown a schematic block diagram of video memory 52 with interconnections to scan converter 58 and interface monitor 60. As briefly described earlier herein, video memory 52 here includes three planes of dynamic ram although it is understood that a different number of planes could be used. Two of these planes identified as video A ram array 68a and video B RAM array 68b each consist of a 768×768 one bit array, and they collectively store a radar video image that is used to raster scan the radar image on screen 54. Specifically, the radar video image as transferred to screen 54 includes a raster of 768×768 picture elements or pixels each corresponding to a spacial location within the region scanned by antenna 24, and the display characteristic (e.g. brightness or color) of each pixel is defined by two bits——one bit from video A memory 68a and one bit from video B memory 68b. Thus, each pixel corresponds to two bits in video memory 52, and therefore has one of four possible video levels. A third memory plane identified as synthetics RAM array 68c stores synthetics that remain fixed with respect to the display screen 54. The raster scan field of monitor 56 has 1024 pixels in each row and 768 pixels in each column. There is a 1:1 correspondence between memory address locations in synthetic memory 68c and pixels or picture elements of the display image on screen 54. Video A memory 68a and video B memory 68b overlay the left 768 pixel columns of display screen 54, and provide the radar image.

Although other types and organizations of memory could be used, each memory 68a, 68b, and 68c here includes an array of Texas Instrument type TMS 4161 256×256 bit multiport dynamic memories. Accordingly, in video A memory 68a and VIDEO B memory 68b, nine 256×256 bit memories are organized into three rows and three columns to provide the 768×768 bit memory field. Synthetic memory 768c has an additional column of three 256×256 bit memories. Shift registers 70a, 70b, and 70c, respectively include storage for 768, 768, and 1024 bits and each functionally corresponds to the combination of the shift register output ports of the 256×256 bit memories that are presently being selected for reading out a row or line for a raster scan. While a few additional memory cycles may be used to refresh and insure the integrity of the data in memories 68a-c, the above described memory organization enables the data for an entire 768 or 1024 pixel display line to be read out of respective memories 68a-c in only one memory cycle. Accordingly, as will become apparent later on, scan converter 58 has access to memories 68a-c most of the time thereby avoiding memory contentions between scan converter 58 and monitor interface 60.

Still referring to FIG. 3, video memory 52 cycles are run at the request of either scan converter 58 or monitor interface 60. The scan cycle request SC REQ, and display cycle request, DC REQ, are respectively transmitted from scan converter 58 and monitor interface 60 to arbiter 72 of video memory 52. DC REQ, which indicates that a line of video data is required for output to monitor 56, is the higher priority of the service request. Therefore, when arbiter 72 receives a DC REQ, it waits until the cycle in progress, if any, is completed and then provides a control signal to memory address multiplexer 74 to couple the ROW ADDRESS from monitor interface 60 to memories 68a-c. Here, the eight most significant bits of ROW ADDRESS from monitor interface 60 to memories 68a-c are routed through memory address multiplexer 74 to identify the row, and two least significant bits are used to select the appropriate 256×256 memories of the array that store the data for the desired row. This operation and any memory refresh cycles occur during the horizontal retrace time of the CRT of monitor 56. Once the data row has been read out of memories 68a-c into respective shift registers 70a-c, arbiter 72 issues a display cycle acknowledge DC ACK to monitor interface 60 indicating that it may commence shifting of shift registers 70a-c as necessary to satisfy the requirements of monitor 56.

Monitor interface 60 processes the digital data read out of video memory 52 in a manner making it suitable for bit image raster display on the screen 54 of monitor 56. As described earlier, a radar return image is displayed on the left of screen 54 and is made up of 768×768 pixels each having a display level defined by two bits: one bit stored in video A memory 68a and the other bit stored in video B memory 68b. More specifically, referring to FIG. 4, the combination of a video A memory 68a bit ($MA_m$) and a corresponding video B memory 68b bit ($MB_m$) define the enhancement display level on screen 54. For example, if $MA_m=MB_m=0$, the particular pixel will be OFF; if $M_m=0$ and $MB_m=1$, the particular pixel will be DIM; if $MA_m=1$ and $MB_m=0$, the particular pixel will be MEDIUM brightness; and if $MA_m=MB_m=1$, the particular pixel will be enhanced to the BRIGHT level. Alternately, the 11 level could be displayed as a different color.

The other type of memory request that is honored by arbiter 72 is the SC REQ from scan converter 58 indicating that new data is available for updating video memory 52. The MODE CONTROL signal which may come from scan converter 58 but which is derived from system processor 40, identifies whether the update data is VIDEO data which is destined for modifying the contents of Video A and B memories 68a and b or is synthetic data destined for synthetic memory 68c. Arbiter 72 routes the addresses through memory address multiplexer 74 accordingly. The data input to synthetic memory 68c is not shown. If there is no DC REQ pending when SC REQ is received by arbiter 72, a read-modified-write cycle is performed at the address furnished by scan converter 58.

If the cycle as specified by MODE CONTROL signal is an update to video A and B memories 68a and b, the data modification is defined by video write logic 76. For each x,y address provided by scan converter 58, video write logic 76 receives the Q output of memory K 78, the Q outputs ($MA_m$ and $MB_m$) of video A and B memories 68a and b, respectively, a FIRST TIME IN (FTI) bit, a LAST TIME IN (LTI) bit, and the new VIDEO from scan converter 58. Memory K 78 is a random access memory having a memory plane that is smaller than the capacity of either video A memory 68a or video B memory 68b because it only stores video data corresponding to the short range pixels in proximity to the antenna 24 where there may be a plurality of sweep lines through each pixel. More specifically, the function of memory K 78 is to prevent overwriting of data for a pixel by the subsequent generation of the same pixel address by scan converter 58 during the same scan. For example, if a plurality of sweep lines of scan converter 58 passed through the same close-in pixel during a single scan, memory K 78 would prevent that pixel from being updated for each sweep. Without memory K 78, there could be a plurality of detected returns and that data could be overwritten by the last sweep through the pixel wherein no return was received. Also, with the operation of PAL 82 to be described subsequently, unintended results could be written into video A and B memories 68a and b. Thus, memory K 78 is interposed before video A and B memories 68a and b to provide resultant or composite video data in response to all of the new VIDEO data provided for a given pixel corresponding to an x,y memory address during a scan. Then, video A and B memories 68a and b are updated using the resultant video data after the last sweep for the scan passing through the pixel has been processed. Here, the resultant video data is the OR of all the individual VIDEO data bits so, if a VIDEO return has been detected on any sweep line through a pixel, the pixel is updated as if there was only one sweep through the pixel and a video return was detected. Stated differently, memory K 78 provides a process of waiting until all of the returns are in for a particular pixel during a scan, and then generating resultant or composite data for that pixel. Such operation prevents overwriting video A and B memories 68a and b by subsequent sweeps of the same scan.

As described in detail in U.S. Pat. No. 4,833,475, scan converter 58 provides an x,y address for each new single bit VIDEO data read out of a range cell in range memory 50. Scan converter 58 also provides FIRST TIME IN (FTI) and LAST TIME IN (LTI) signals which are indicative of whether that address is being provided for the first time or last time during that scan. For example, if FTI=1, the x,y pixel address is being provided for the first time during the scan. If LTI=1, the x,y pixel address is being generated for the last time during the scan. Each x,y address is coupled from scan converter 58 to memory K 78 to read the addressed $MK_m$ bit from the Q output for transfer to programmable array logic PAL 80 of video write logic 76. $MK_m$ is the addressed bit from memory K 78 for moment m. The other two inputs to PAL 80 are the FTI bit and VIDEO from scan converter 58. These three inputs determine $MK_{m+1}$ which is the moment+1 update written back through the D input of memory K 78 for the currently addressed bit.

In review, VIDEO is the video data stored in range memory 50 and a "1" indicates that a return has been detected. FTI is "1" if it is the first time that the present pixel corresponding address has been generated during the scan. The value of VIDEO is written into memory K 78 if it is the first time during the present scan that the pixel corresponding address location has been generated (FTI=1). Accordingly, the readout value for $MK_m$, which would be from the previous scan, is overwritten. Viewed differently, $MK_m$ may be considered as being reset to 0 for the first sweep of the present scan through a pixel, and then $MK_{m+1}$ takes on the value on the new VIDEO. If it is not the first sweep of the scan through pixel (FTI=0), then $MK_{m+1}$ is written back to memory K 78 as a 1 if either the present VIDEO or $MK_m$ is a 1. The $MK_{m+1}$ written back in then becomes $MK_m$ for the next sweep through that pixel. Accordingly, if VIDEO is 1 for any sweep through a pixel during a scan, the final $MK_{m+1}$ will be 1. Only part of the address field of video A and B memories 68a and b is used to address memory K 78 because it is smaller. Accordingly, to prevent storage locations in memory K 78 from being incorrectly addressed by addresses outside its field, memory K 78 is inhibited when FTI and LTI are simultaneously 1. In summary, memory K 78 functions as a buffer memory that OR$^s$ the successive VIDEO data for pixels that are addressed a plurality or times during a single scan, and then VIDEO A and B memories 68a and b are only modified after all of VIDEO is reviewed for the scan. Those skilled in the art will recognize that a resultant or final $MK_{m+1}$ could be provided using methods other than ORing all of the video data for each pixel corresponding address.

Referring to FIG. 5, a logic table depicts the operation of programmable array logic PAL 82 which controls the updating of VIDEO A and B memories 68a and b, respectively. The inputs to PAL 82 are $MK_{m+1}$ from PAL 80, the addressed bit from the Q output of VIDEO A memory ($MA_m$), the addressed bit from the Q output of video B memory ($MB_m$), and the LAST TIME IN (LTI) bit from scan converter 58. In partial review, the LAST TIME IN (LTI) bit is provided by scan converter 58 and indicates whether the present x,y pixel address will be provided again during the present scan. If the present x,y pixel address will be provided by a subsequent sweep line through that pixel, then the video A and B memories 68a and b will not be updated because, as described heretofore, it is preferable to wait until all of the data for that pixel is received on the present scan so that the pixel can be modified in accordance with composite data. However, if the present x,y pixel address will not be provided again during the present scan, then it is desirable to go ahead and modified the contents of video A and B memories for that pixel. If LTI=0, the present x,y pixel address will be provided again during the present scan, and if LTI=1, it won't be. Thus, video A and B memories 68a and b are only updated if LTI=1.

Still referring to FIG. 5, the $MA_m$ and $MB_m$ bits are the data read out of the Q outputs of video A and B memories 68a and b, respectively, for the present x,y pixel address. Collectively, $MA_m$ and $MB_m$ are representative of the history of echo returns from the present x,y pixel, and, as described earlier, they determine the brightness or color with which the respective pixel is displayed on screen 54 of monitor 56. For example, as shown in FIG. 4, the pixel is OFF for 00, DIM for 01, MEDIUM for 10, and BRIGHT for 11. The $MK_{m+1}$ bit is the new video data for updating that particular pixel. $M_{m+1}$ may be the data from the range cell memory 50, or if there were a plurality of returns from the same pixel, it may be the final or composite data for that pixel obtained from memory K 78. In either case, if $M_{m+1}=1$, it means that an echo return was detected (i.e. exceeded the threshold) for that range cell. If $MK_{m+1}=0$, it means no echo return was detected. Still referring to FIG. 5, the current pixel level at moment M as represented by $MA_m$ and $MB_m$ is modified in accordance with the new video data $MK_{m+1}$ for that pixel, and the modified pixel level at moment m+1 as represented by $MA_{m+1}$ and $MB_{m+1}$ is written back into respective addressed locations of video A and video B memories 68a and b. Thus, $MA_m$ and $MB_m$ represent the read data and $MA_{m+1}$ and $MB_{m+1}$ represent the new data written back in the respective locations on the D inputs of video A and B memories 68a and b from video write logic 76.

Having defined the parameters for FIG. 5, it can be seen that if LTI=0, $MA_{m+1}$ and $MB_{m+1}$ remain unchanged from $MA_m$ and $MB_m$, respectively. In short, video A and video B memories 68a and b are not updated or modified in accordance with new data because all of the returns for that x,y pixel for the current scan have not yet been received or processed. Stated differently, the particular x,y pixel locations in video A and B memories 68a and b are only updated or modified if LTI=1, thereby indicating that there will be no more new data for that x,y address or pixel during the current scan. The discussion hereinafter assumes that LTI=1.

If there is no detected return for the present x,y pixel ($MK_{m+1}=0$), then the pixel write level is decremented one brightness level. For example, 11→10, 10→01, 01→00 wherein $MA_m$ and $MB_m$ are the values before modification and $MA_{m+1}$ and $MB_{m+1}$ are the values after modification. Thus, if an echo return is not detected for three sequential scans, that will guarantee that the particular x,y pixel will be OFF (i.e. not displayed).

In accordance with the invention, the particular x,y pixel is modified to the BRIGHT or most enhanced level (11) if an echo is detected ($MK_{m+1}=1$) and the pixel was OFF ($MA_m=MB_m=0$). Thus, a moving target such as an aircraft 36 that has moved in the scanned region to a new spacial location corresponding to a new set of x,y pixels from which returns were not detected on previous scans would have enhanced display. In other words, rather than enhancing the display if there is a positive scan-to-scan correlation with a history of data from the same spacial location, PAL 82 here provides an enhanced display if there is no such positive correlation. Thus, the display of moving targets is enhanced so that it is easier for the operator to concentrate or focus on the most critical targets—those targets that would most likely become involved in a collision.

Once the moving target or object vacates or moves on from a set of pixels that have been displayed with enhancement (e.g. 11 causing a BRIGHT or distinctive color display), the display of that vacated region or set of pixels will decay through a sequence of brightness levels from scan-to-scan as described heretofore when $MK_{m+1}=0$. In other words, the display of the vacated region will not disappear immediately, but will gradually disappear through MEDIUM and DIM steps. Thus, a trail effect is produced as the target moves across screen 54. The most recent echo returns from the moving target are seen at the BRIGHT level (11); the echo returns from the immediately prior scan are seen at the MEDIUM brightness level 10; and the set of echo returns from the next earlier scan are seen at the DIM brightness level (01). Thus, depending on the scan rate and the target speed, there may typically be three sets of echo returns from a moving target of interest on the screen 54 at any time thereby giving the operator an immediate visual clue to the speed and direction of travel of the moving targets or objects. More specifically, referring to FIG. 6, a depiction of a radar image on screen 54 shows a multi-pixel image 84a of an aircraft taking off on runway 86 which is overlaid by synthetics memory 68c on the radar image data from video A and b memories 68a and b. 84a is displayed at the BRIGHT level (11) here shown as solid or some correspondingly distinctive color because the echo returns from the aircraft at this spacial location do not correlate with echo returns from this same spacial location on earlier scans; the aircraft wasn't there then. Pixel image 84b, which was the location of the aircraft on the previous scan, was previously displayed BRIGHT (11), but now, in accordance with PAL 82, is reduced to MEDIUM level (10) here shown as dotted because it was modified by $MK_{m+1}=0$. Further, in like manner, 84c shows the spacial location of the aircraft two scans earlier, and it is now displayed at a DIM level (01) here shown with a dashed outline. A typical scan rate is 30 rpm, so the spacing between 84a-b-c represents how far the aircraft has moved in consecutive two second increments.

Figure 6:
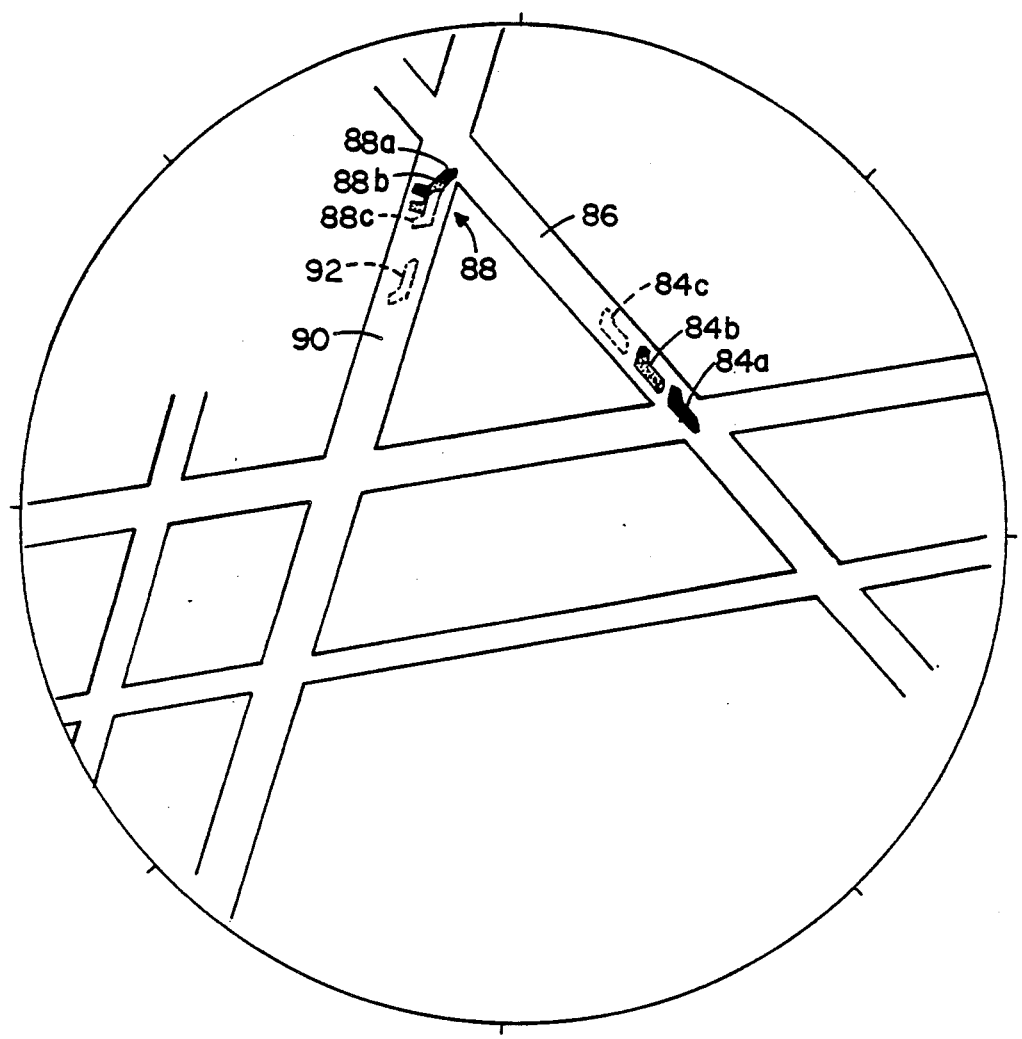
FIG. 6 is a pictorial representation of a radar display.

Further, still referring to FIG. 6, target image 88 has a portion 88a displayed at the BRIGHT level (11) and other portions 88b and 88c displayed at a MEDIUM (10) and DIM (01) levels, respectively. Such image would indicate that the target aircraft 88 is moving thereby creating the partial BRIGHT level 88a, but moving at a relatively slow speed as it taxies into position for take off from taxiway 90 onto runway 86. In other words, in the two second increment between scans, the aircraft did not move a distance equivalent to its length, so part of it provides echo returns with positive correlation while others are from portions of the aircraft without positive correlations. Radar image 92 represents another aircraft that is not moving on taxiway 90.

In accordance with the invention, another feature of the operation of PAL 82 is that if echo returns persist ($MK_{m+1}=1$) from a given spacial location, the video memory level is driven to the DIM level (01) where it remains unless echo returns are not detected ($MK_{m+1}=0$) such as would occur if the object or target moves to a different spacial location. Thus, stationary objects or targets such as parked ground vehicles or aircraft such as represented by image 92 that could present a collision hazard for moving objects or targets are continuously displayed at a DIM but observable level (01) while moving targets that are of greater interest are displayed at an enhanced level (i.e. BRIGHT or distinctive color).

Figure 7:
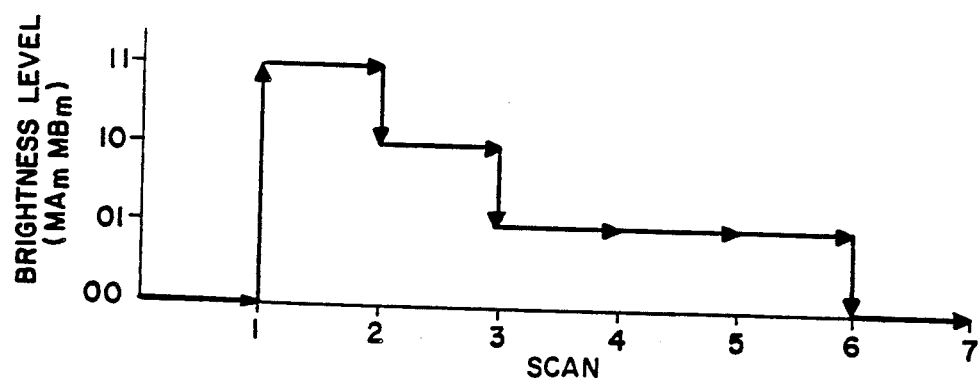
FIG. 7 illustrates the modification of the video memory in response to a described radar return scenario.

The heretofore described operation of PAL 82 is pictorially shown in FIG. 7. It is assumed that before scan 1, a particular multi-bit storage location within video A and B memories 68a and b stores a 00 thereby determining that the corresponding display pixel is OFF. At scan 1, an echo return is detected ($MK_{m+1}=1$) so, in accordance with PAL 82 as defined by FIG. 5, the brightness level is immediately driven to the enhanced or BRIGHT level (11). At scan 2, it makes no difference if detected returns persist ($MK_{m+1}=1$) or not ($MK_{m+1}=0$) from that spacial location; in either case, the display level is decremented to 10 (MEDIUM brightness). The same is true for scan 3 wherein, regardless of whether there is a detected return ($MK_{m+1}=1$) or not ($MK_{m+1}$), the display level is decremented to 01 (DIM). Then, if the detected returns persist ($MK_{m+1}=1$) from that spacial location such as shown for scans 4 and 5, the display remains at 01 (DIM). If however, there is no detected return as shown at scan 6, then and only then is the pixel turned OFF (00). Now, if a target or object moves to that corresponding spacial location, its display will be enhanced to the BRIGHT (11) level.

This concludes the description of the preferred embodiment. However, a reading of it by one skilled in the art will bring to mind many alterations and modifications that do not depart from the spirit and scope of the invention. Accordingly, it is intended that the scope of the invention be limited only by the appended claims.

What is claimed is:

1. A method of processing radar returns received on a plurality of scans of a region, comprising the steps of:
   providing a scan-to-scan correlated image of radar returns from the region; and
   displaying said image as a plurality of pixels wherein pixels corresponding to new radar returns without positive correlation on at least the immediately prior scan of the region are displayed with an enhanced characteristic and pixels displayed with said enhanced characteristic are displayed with a characteristic other than said enhanced characteristic on the next scan regardless of whether new radar returns are received.

2. The method recited in claim 1 wherein pixels displayed with said enhanced characteristic are displayed at a brighter level than other ones of said pixels.

3. The method recited in claim 1 wherein pixels displayed with said enhanced characteristic are displayed at a different color than other ones of said pixels.

4. The method recited in claim 1 further comprising the step of digitizing said radar returns before providing said scan-to-scan correlation.

5. The method recited in claim 4 further comprising the step of storing said image of said scan-to-scan correlated radar returns in a bit image memory having a plurality of bits corresponding to each pixel.

6. The method recited in claim 1 further comprising the steps of scan converting said radar returns into an x,y format.

7. A method of processing radar returns from repeated scans of a region, comprising the steps of:
digitizing said radar returns;
scan converting said digitized radar returns into an x,y format of said region;
correlating said digitized returns from scan-to-scan to develop a raster scan image formed by a plurality of x,y pixels each represented by a multi-bit value corresponding to correlation of radar returns received from the same spacial location on successive scans;
transferring said image to a visual display and displaying at a brightest level those pixels which were off after the next to last scan and for which corresponding radar returns have been received on the last scan; and
displaying at a level other than said brightest level those pixels which were displayed at the brightest level after the next to last scan regardless of whether radar returns were received on the last scan.

8. The method recited in claim 7 further comprising the step of storing said raster scan image in a multi-plane bit image memory.

9. The method recited in claim 8 wherein said scan-to-scan correlating comprises the step of reading a multi-bit value from said memory for each new digitized radar return, modifying said read value in accordance with said new digitized radar return, and writing said modified value back into said memory.

10. A method of processing echo signals, comprising the steps of:
repeatedly scanning a predetermined region for echo signals reflected from objects within said predetermined region;
providing a digital representation of each of said echo signals wherein each of said digital representations is arranged according to the spacial location of the object within the region from which the respective echo signal was reflected;
spacially correlating said digital representations from scan-to-scan; and
displaying said correlated digital representations wherein the display of digital representations without prior correlation are enhanced and enhanced digital representations are displayed without enhancement on the next scan regardless of whether echo signals are received.

11. A method of processing echoes received from repeated scans of a region, comprising the steps of:
providing a bit image in a memory having a plurality of multi-bit storage locations each corresponding to a pixel of a raster scan display wherein each of said multi-bit storage locations contains digitized video data corresponding to a history of echoes from a respective point in space;
modifying said digitized video data to enhance the display of pixels that correspond to newly received echoes that are received from respective points in space from which echoes were not received on at least the most recent prior scan of said region; and
modifying said digitized video data to display without enhancement those pixels that were displayed with enhancement on the last scan regardless of whether newly received echoes were received on the most recent scan.

12. In a radar system having a memory storing a radar image used to raster scan a visual display wherein said radar image is representative of a history of returns from a plurality of scans of a region and is formed by pixels each of which is stored at a pixel location as a digital level corresponding to a brightness display level between off and bright with at least one intermediate level, a method comprising the steps of:
detecting radar returns on a plurality of scans of said region;
modifying said radar image in said memory by storing said bright digital level at pixel locations that were at said off level and for which respective radar returns have been detected on the most recent scan of said region; and
modifying said radar image in said memory by storing said at least one intermediate level at pixel locations that were at said bright level on the last scan regardless of whether radar returns have been detected on the most recent scan of said region.

13. The method recited in claim 12 further comprising the step of storing said at least one intermediate level at pixel locations which were at said bright level and for which respective radar returns have been detected on the most recent scan of the region.

14. The method recited in claim 12 further comprising the step of scan converting the radar returns into the format of said memory by providing respective addresses for said pixel locations.

15. The method recited in claim 12 further comprising the step of delaying the modification for one of said pixel locations in said memory until all of the possible detected returns for said one location have been received on the present scan of said region.

16. Radar apparatus for azimuth scanning a region on a plurality of successive scans, comprising:
a raster scan visual display;
bit image memory means for providing digital data to raster scan said visual display, said memory means having a multi-bit storage location for each pixel on at least a portion of said raster scan display wherein each of said pixels is displayed at one of a plurality of different brightness levels; and
means responsive to echo returns from objects in said region on a plurality of successive scans for developing a scan-to-scan correlated radar image of said region in said bit image memory, said developing means comprising means for providing digitized data to said memory means to provide a bright level display of each pixel that corresponds to an echo return from a respective spacial location from which an echo return was not received on a predetermined number of prior scans and to provide a display level other than said bright level on the last scan for each pixel that was displayed at said bright level regardless of corresponding echo returns on the most recent scan so as to enhance the display of moving objects in said region that have moved to new locations since the last scan.

17. The radar apparatus recited in claim 16 wherein said developing means comprises means for providing a dimmer level display of each pixel that corresponds to an echo return from a respective spacial location from which an echo return was received on the last scan.

18. The radar apparatus recited in claim 16 wherein said developing means comprising means for displaying one of said bright level pixels at a dimmer level after at least one scan in which no corresponding echo return is received.

19. The radar apparatus recited in claim 16 wherein said developing means comprises means for limiting the digitized data update for each pixel to once per scan.

20. The radar apparatus recited in claim 16 further comprising means for providing x,y addresses to map each of said echo returns into the raster scan format of said memory.

21. Apparatus for processing radar returns received on a plurality of scans of a region, comprising:
means for providing a scan-to-scan correlated image of radar returns from the region; and
means for displaying said image as a plurality of pixels, said displaying means comprising means for enhancing with respect to all other pixels the display of pixels corresponding to new radar returns without positive correlation on a plurality of successive prior scans of the region.

22. The apparatus recited in claim 21 wherein said enhancing means comprises means for displaying pixels at different brightness levels.

23. The apparatus recited in claim 21 wherein said enhancing means comprises means for displaying pixels at different colors.

24. The apparatus recited in claim 21 further comprising means for converting said radar returns to an x,y format so that said image can be displayed by raster scanning.

25. The apparatus recited in claim 24 further comprising a bit image memory for storing said image.

26. Radar apparatus, comprising:
means for repeatedly scanning a predetermined region for echo signals;
means for digitizing said echo signals to provide digital data corresponding to echo signals reflected from objects at respective spacial locations within said predetermined region;
means for scan-to-scan correlating said digital data according to spacial location; and
means responsive to said correlating means for providing a visual image representative of objects in said predetermined region from which said echo signals are reflected, said displaying means comprising means for enhancing the representative display of an object that has moved to a new spacial location since the last scan and for diminishing the enhancement of such spacial location on the next scan regardless of whether echo signals are received.

27. Radar apparatus, comprising:
means for repeatedly scanning a predetermined region for echo signals from objects within said predetermined region;
means for providing digital representations of said echo signals wherein each of said digital representations is arranged according to the spacial location of the respective object within said region from which the echo signal was reflected;
means for spacially correlating said digital representations from scan-to-scan; and
means for displaying said correlated digital representations wherein digital representations that do not correlate positively with digital representations from a predetermined number of scans are enhanced and enhanced digital representations are diminished on the next scan regardless of whether corresponding echo signals are received.

28. Radar display apparatus for an azimuth scanning radar comprising:
means for receiving echo signals from objects on sequential scans of a predetermined region;
means responsive to said echo signals for providing digitized radar video;
electronic digital storage means having a plurality of multi-bit storage location each corresponding to a predetermined pixel of an image of said predetermined region;
means for modifying digital data stored in said electronic digital storage means in accordance with newly received digitized radar video so that the digital data in each of said multi-bit storage locations is representative of the degree of positive correlation of digitized radar video occurring at the respective pixels on successive radar azimuth scans; and
means for displaying said digital data from said electronic digital storing means wherein pixels without positive correlation with previous scans are enhanced and enhanced pixels are displayed without enhancement on the next scan regardless of whether corresponding echo signals are received.

29. Radar display apparatus for an azimuth scanning radar, comprising:
a visual display;
a bit image memory for providing raster scan video data to said visual display, said bit image memory having multi-bit storage locations for each pixel in a predetermined field of pixels on said display wherein each pixel can be displayed at different levels of brightness; and
means for continuously modifying the digital data stored in said bit image memory in accordance with new digitized radar video received on the most recent scan so that the digital data in said memory is scan-to-scan correlated data for said field of pixels, said modifying means comprising means for enhancing the display of digital data for a pixel if a new digitized radar video return is received and there is no positive scan-to-scan correlation and for deemphasizing the display of an enhanced pixel on the next scan regardless of whether a new digitized radar video return is received.

30. In a radar system having a memory storing a radar image used to raster scan a visual display wherein said radar image is representative of a history of returns from a plurality of scans of a region and is formed by pixels each of which is stored at a pixel location as a digital level corresponding to a display brightness level between off and bright with at least one intermediate brightness level, an apparatus comprising:

means for detecting radar returns on a plurality of scans of said region;

means responsive to said detecting means for modifying said radar image in said memory, said modifying means comprising means for storing said bright digital level at a pixel location which is at said off level and for which a radar return has been detected on the most recent scan of said region; and means for storing said at least one intermediate brightness level at a pixel location which is at said bright level and for which a corresponding radar return has been detected on the most recent scan of said region.

31. The apparatus recited in claim 30 further comprising means for storing said at least one intermediate brightness level at a pixel location which is at said bright level and for which a corresponding radar return has been detected on the most recent scan of said region.

32. The apparatus recited in claim 30 further comprising scan converter means for providing addresses corresponding to said pixel locations in said memory.

33. The apparatus recited in claim 30 wherein said storing means comprises programmable array logic.

34. The apparatus recited in claim 30 further comprising means for delaying the storing of a new digital level into one pixel location until all the returns corresponding to said one pixel have been received for the present scan of said region.

* * * * *